United States Patent [19]

Bertelsen

[11] 4,175,637

[45] Nov. 27, 1979

[54] SURFACE EFFECT VEHICLES AND GUIDEWAYS THEREFOR

[76] Inventor: William R. Bertelsen, 2720 31st Ave., Rock Island, Ill. 61201

[21] Appl. No.: 520,795

[22] Filed: Nov. 4, 1974

Related U.S. Application Data

[60] Division of Ser. No. 321,948, Jan. 8, 1973, Pat. No. 3,845,716, which is a continuation-in-part of Ser. No. 871,765, Jul. 31, 1970, Pat. No. 3,712,406, which is a continuation-in-part of Ser. No. 633,357, Apr. 21, 1967, which is a continuation-in-part of Ser. No. 731,001, Apr. 25, 1958, abandoned.

[51] Int. Cl.² .................................................. B60V 1/16
[52] U.S. Cl. .................................. 180/128; 104/23 FS; 180/121
[58] Field of Search ............... 180/116, 117, 118, 120, 180/127, 115, 128; 104/23 FS, 134, 138, 120, 1 R

[56] References Cited

U.S. PATENT DOCUMENTS

| | | | |
|---|---|---|---|
| 1,053,368 | 12/1913 | Eells | 104/23 FS |
| 3,096,728 | 7/1963 | Amann | 104/23 FS |
| 3,177,960 | 4/1965 | Cockerell | 180/129 |
| 3,330,221 | 7/1967 | Trillo | 104/23 FS |
| 3,481,423 | 12/1969 | Winter | 180/127 X |
| 3,500,763 | 3/1970 | Mesnager | 104/23 FS |
| 3,550,718 | 12/1970 | Knuth | 180/116 X |
| 3,827,527 | 8/1974 | Bertelsen | 180/120 |

FOREIGN PATENT DOCUMENTS 1214996 12/1970 United Kingdom ............ 180/127

Primary Examiner—John P. Silverstrim

[57] ABSTRACT

A ground effect vehicle of the type supported by a cushion of gas and especially adapted for use within specially constructed roadways providing guidance along a plurality of axes. The application describes vehicles having skirts with lower margins adapted to conform to the cross sections of the roadways, with the roadways preferably being of arcuate cross section whereby sustenance of the vehicle is accomplished by maintaining an air cushion between the skirt and the bottom portion of the roadway, and whereby turning of the vehicle is accomplished by the banking of the vehicle in combination with the reaction to a curvilinear roadway sidewall, or in response to thrust having a lateral vector, or both. The disclosure is directed to the construction and operation of such roadways, including roadways which are partially or completely circular in cross section to roadways especially designed to permit vertical and traversing travel in respect to hills and controlled travel in respect to descent along the straight line or a traverse line. Other roadway constructions which are adapted to make partial use of existing rights-of-way are also described as are preferred traffic pattern layouts, etc.

6 Claims, 34 Drawing Figures

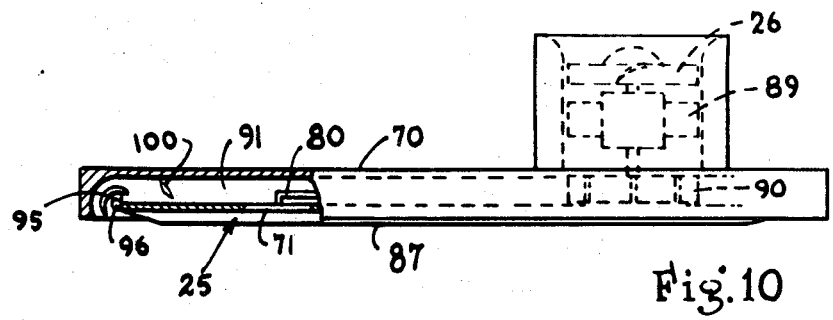
Fig.10
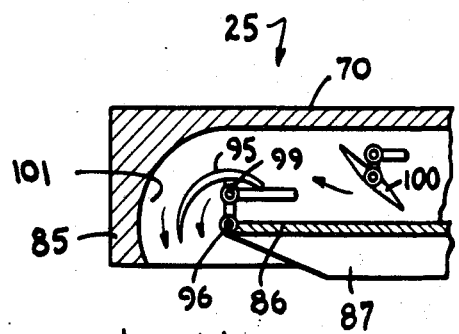
Fig.11
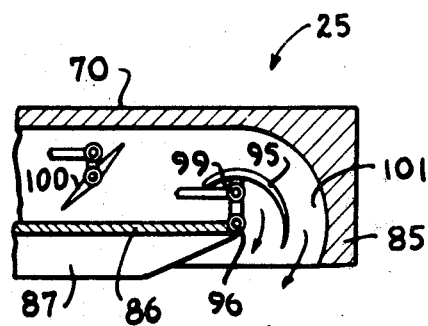
Fig.12
Fig.14
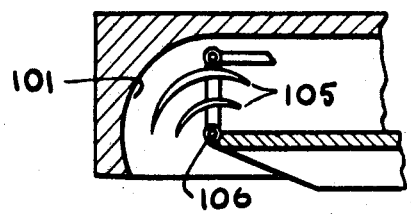
Fig.13

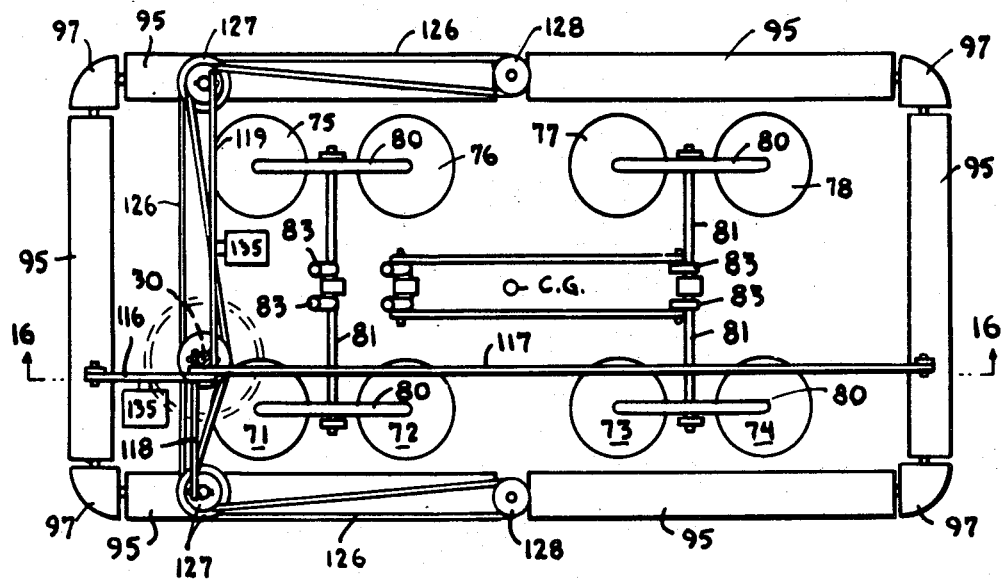
Fig. 15
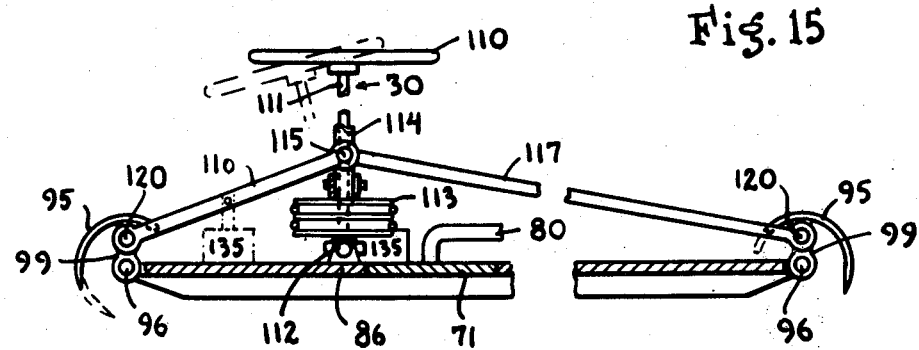
Fig. 16
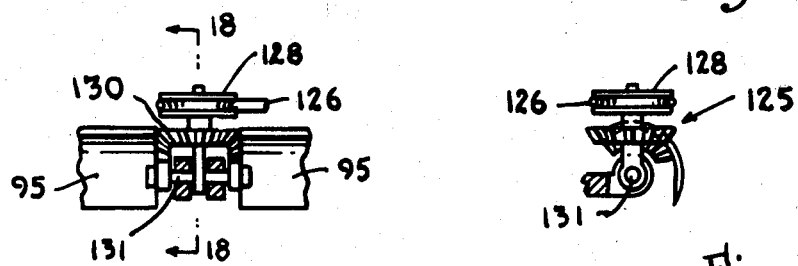
Fig. 17
Fig. 18

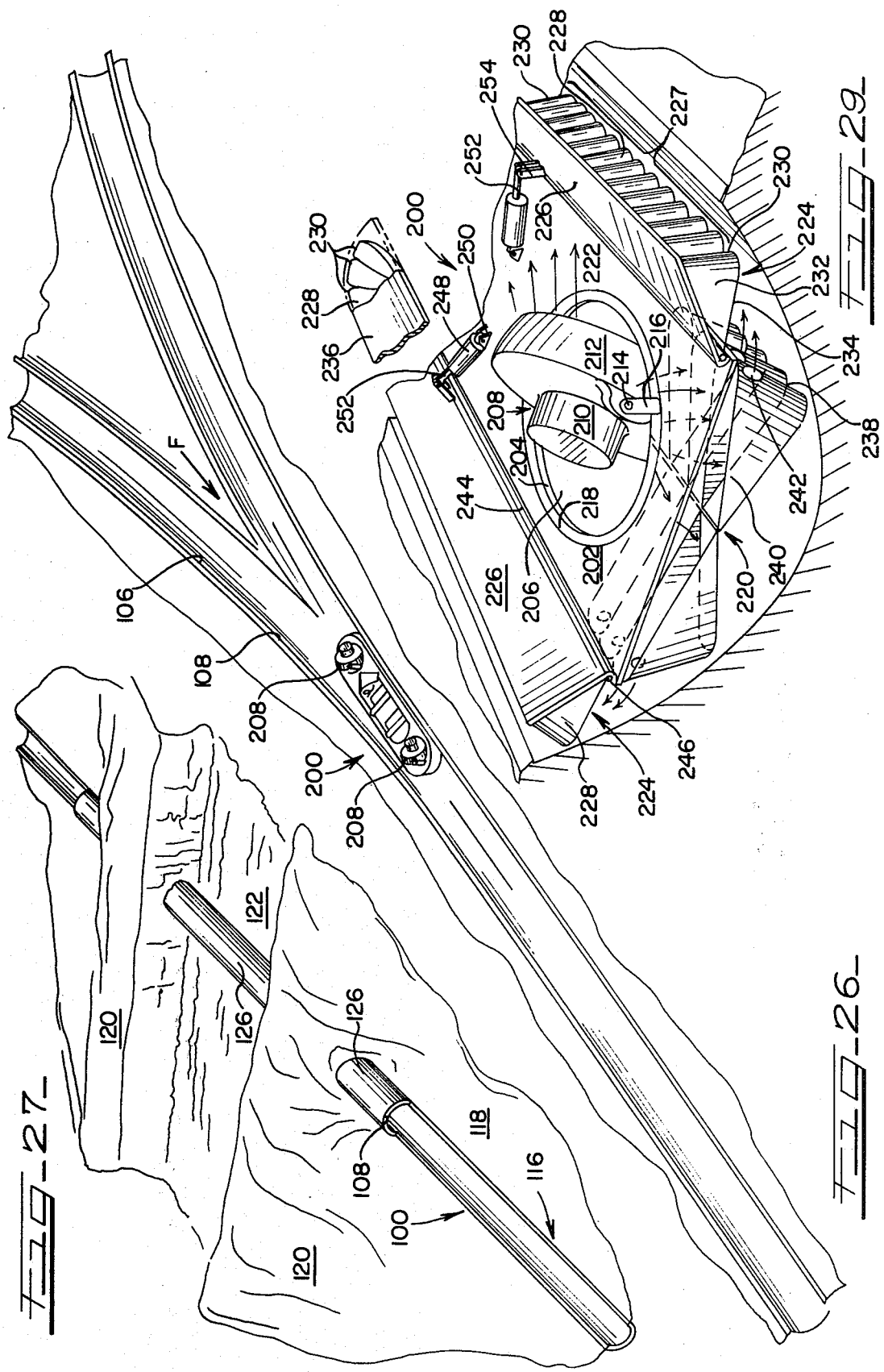

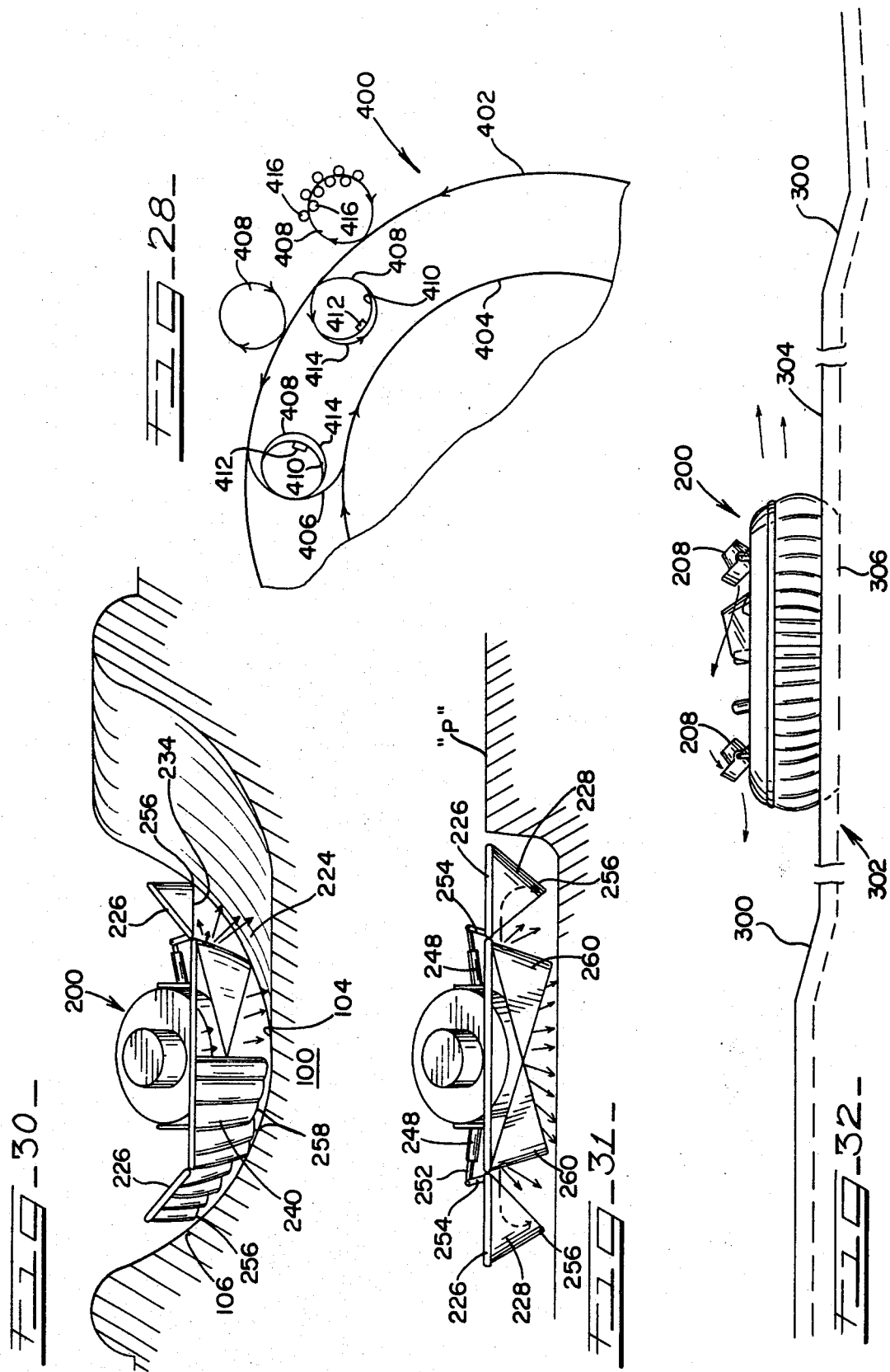

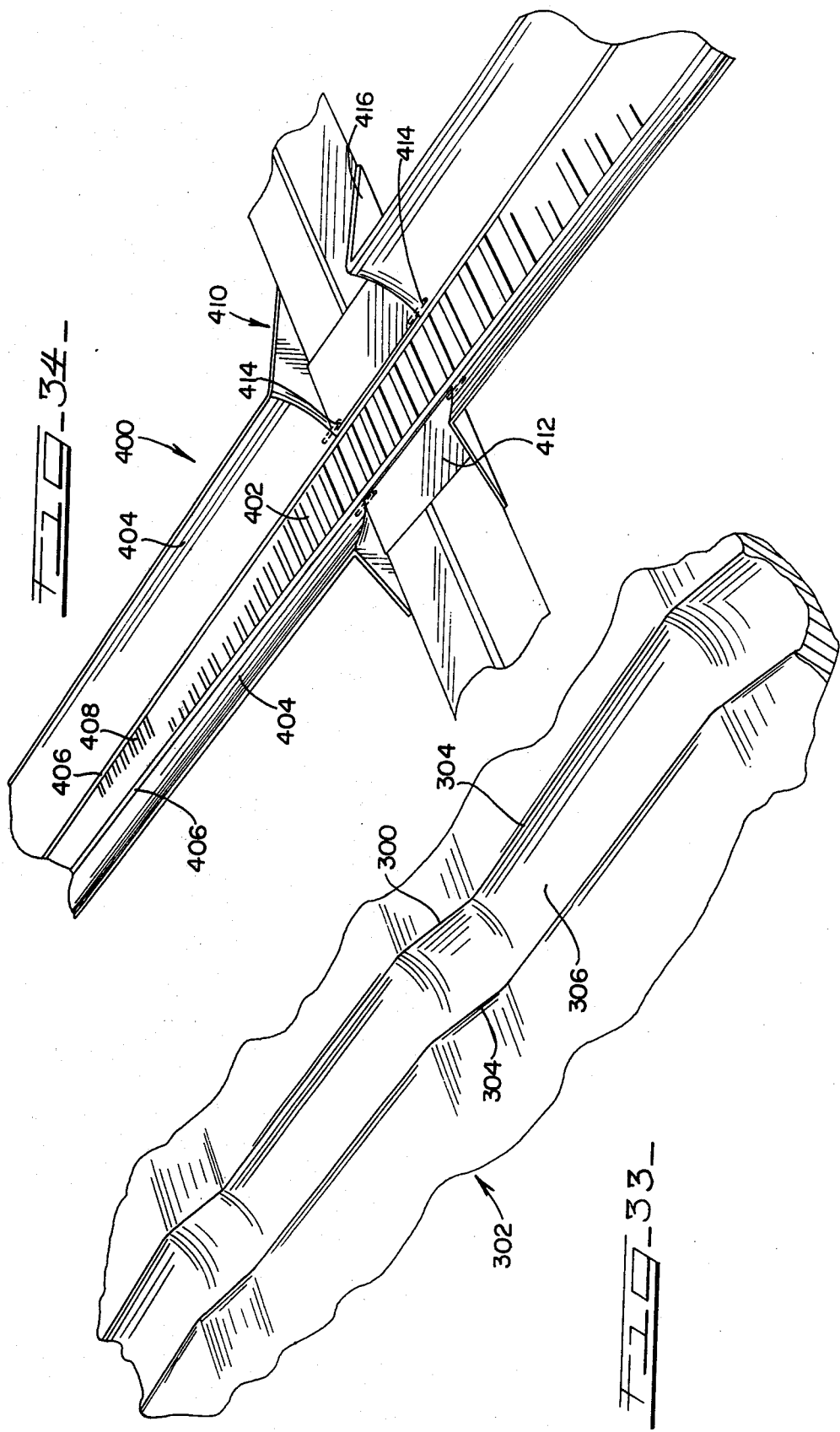

SURFACE EFFECT VEHICLES AND GUIDEWAYS THEREFOR

CROSS REFERENCE TO RELATED APPLICATIONS

This is a division of application Ser. No. 321,948, filed Jan. 8, 1973, now U.S. Pat. No. 3,845,716, which was a continuation-in-part of my application Ser. No. 871,655, filed July 31, 1970, now U.S. Pat. No. 3,712,406, which in turn was a continuation-in-part of Ser. No. 633,357, filed Apr. 21, 1967, which was a continuation-in-part of Appln. Ser. No. 731,001, filed Apr. 25, 1958, said last application being now abandoned.

BACKGROUND OF THE INVENTION

The present invention relates to gas sustained vehicles, and in a broad concept to vehicles that are gas or air supported and dirigible either adjacent to or remote from a reaction surface.

One preferred embodiment of the invention comprises a combustion engine powered vehicle adapted to operate slightly above a reaction surface. Being spaced from such surface the vehicle does not depend upon surface condition for support and can operate over soil, water, marsh, snow, etc. In fact, as will appear more fully below, the vehicle will operate more economically over rough terrain than over smooth terrain because of resistance to gas flow caused by surface roughness. In the following specification this vehicle will be referred to as "aeromobile".

Present automobiles are restricted in operation by several conditions. Roads comprise one major condition including several ancillary conditions such as snow, mud, ice, etc. that limit satisfactory use. Automobiles have little or no utility away from roads. The maximum speed attainable by present vehicles is restricted to practicable strength of tires, springs, and other essential parts.

The "aeromobile" herein disclosed is borne upon a layer of compressed gas such as air and the products of combustion of an engine, turbine, or the like.

The "aeromobile" permits use of a different kind of road that will center the vehicle in a lane. The road is grooved and the "aeromobile" equipped with front and rear baffles or other means conforming to the transverse curvature of the groove. When driving along a groove the operator will exercise no control except to accelerate, stop, or move laterally to another groove for passing.

Other modifications of the invention are useful in boats, aircraft, trucks, pallet transporters, crop sprayers, and others. In each of these the same principles of sustentation and control are utilized. Because the vehicle is supported during operation upon a volume of compressed gas, it is preferable to fabricate parts from materials having a favorable weight to strength ratio. The properties of such materials are well known and hence all combinations of specific materials will not be recited in the following specification.

In keeping with the teachings hereof, the basic vehicle comprises a frame having gas inlet and outlet openings. The outlet may comprise several controlled outlet portions to render the vehicle dirigible. A compressor forces gas between the bottom of the vehicle and the surface to float same about the surface. For practical purposes it is preferred that the volume of the gas be variable to support the vehicle at sufficient distance above the surface to clear ordinary road obstacles (6 inches for example) and to provide large volumes for jumping large obstacles.

Although the construction of the vehicle may be any of the popular known types of ground effects vehicles, including those specifically referred to above, the vehicle may also desirably be of the type having gimbal or other universal-mounted ducted fans which may be used in combination with a floor or deck surface to direct flow into the plenum beneath the vehicle floor deck and also to direct a portion of the air in any direction desired above the deck, and to divide such flow in any desired proportion as is easily permitted by such construction, i.e., to use large or small proportions of the total air flow for propulsion and considering control or for sustenance. Certain of the roadways of the invention are described in connection with vehicles of this type, and such vehicles possessing outstanding versatility for other uses without sacrifice of the ability to perform with the roadways of the invention.

Now that the ground effect vehicle has proven practical for certain basic applications, such as for transportation across generally flat surfaces, such as bodies of water and has proven practical for certain recreational uses, more serious attention has been given to the possibility of achieving much greater utility of these vehicles, so that certain of their advantages may be best utilized.

In this connection, it will be appreciated that a ground effect vehicle is perhaps second in potential ride comfort and stability to an aircraft, inasmuch as it floats on a cushion of confined air and in the event that surface irregularities are encountered, the vehicle has an excellent capability of smoothing out the bumps because of the relation of its inertial character and the manner in which it is suspended. Thus, as a reaction vehicle, it tends to attain equilibrium at a certain height above a surface beneath it and with air flow conditions constant, to maintain this position. Unlike wheeled or tracked vehicles, the air cushion vehicle has no unsprung weight to transfer impact and reaction levels to the vehicle, and thus the air cushioned vehicle is not disturbed by wheel imbalance, suspension oscillation, the gyroscopic reactions, etc. Accordingly, the potential of such vehicles for smooth ride is considerable.

Another clear advantage of many ground effect machines is that they may be propelled by a direct reaction rather than through a complex power train, and accordingly, such vehicles, which display minimum frictional displacement in their elevated and sustained condition, ordinarily achieve fairly high speeds in relation to applied power as aircraft, wind resistance. Other induced contact is the primary resistance to propulsion, and although ground effect vehicles may require a certain amount of power to remain airborne even when not moving forward or backward, the amount of power required for sustenance does not increase as speeds increase, while, in automobiles, trucks, and the like, rolling friction may be significant, particularly in the case of heavy vehicles.

Another important advantage of the air cushion or ground effect vehicle is that such vehicles do not necessarily require a roadway, and, under proper conditions, may operate over water, sand, or swamp terrain. Improvements made in the flexible skirts which define the periphery of the plenum or chamber which supports the vehicle have rendered these vehicles more versatile than certain air cushion vehicles which were proposed some time ago.

Referring now to certain of the drawbacks inherently associated with air cushion vehicles, many of which have not been overcome to date, it is acknowledged that, by reason of being supported with a minimum of friction, such vehicles tend to rotate by their own vertical axis if unstabilized and such units also tend to slide or coast down in declivities so that it is difficult to propel the vehicle along a desired course where such course goes up, down, or across hills and valleys. Thus, although the vehicle will remain spaced apart from the surface beneath it, the vehicle requires application of strong propulsion and controling forces to avoid sliding down inclined surfaces.

Even where there are few or minimal elevational contours on the surface over which the vehicles pass, turning or other guiding of the vehicle tends to become inaccurate and vague, much like that of an aircraft or helicopter near the stalling speed. Such characteristics are inconsistent with broad-based use of air cushion vehicles. In summer, therefore, it might be said that air cushion vehicles are very effective in lifting themselves a short and definite distance above a support and reaction surface and are easily able to be moved rapidly without using excess power. However, such vehicles are very poor and climbing or descending in the ordinary sense and lack precise control which is afforded vehicles such as automobiles and trains which are required to travel at moderate speeds, in densely populated areas in excellent conditions of safety. The present invention is directed to the construction and operation of air cushion vehicles within especially constructed tracks or guideways, to the construction of such guideways, and to the provision of such guideways at minimum cost in order to utilize the best features of the vehicles.

Accordingly, one object of the present invention is to provide an air supported vehicle adapted for dirigible translations.

A second object of the invention is to provide manual control mechanism for a vehicle as set forth in the first object.

A further object is to provide a novel road and an air supported vehicle for operation on said road.

A still further object of the invention is to provide auxiliary controls for augmenting the function of the control mechanism set forth in the second object.

Another object of the invention is to provide structure for transporting passengers and adapted to be air sustained at least partially by aerodynamics forces resulting from translation.

Still another object is to provide a road system particularly adapted for use with ground effect vehicles.

A further object is to provide a combination road and guidance system for air-sustained vehicles of the air cushion type.

Still another object of the invention is to provide roadways for air cushion vehicles wherein the roadways have specially designed characteristics designed to eliminate dust and dirt and to provide a stabilized configuration at minimum cost.

A still further object is to provide improved road and control systems for controllable air cushion vehicles, including road systems adapted to assist in controlling the flow of air cushion vehicle traffic.

Yet another object is to provide specialized roads designed to assist air cushion vehicles in ascending and descending grades, including grades traversing various hills and other geographic formations.

Another object is to provide means for adapting existing rights-of-way to air cushion vehicle travel, and particularly to means for modifying existing rights-of-way so as to facilitate control as well as passage of the vehicles.

Still another object is to provide specially constructed air cushion vehicles which are adapted to conform at least in part to the contour of roads over which vehicles pass, and which constructions also facilitate control of the vehicle in various maneuvers, such as switching and turning.

Another object of the invention is to provide a basic roadway configuration which is adapted for use on the surface of the earth over various substrate such as earth, water, and the like, which is also suitable for passage through or under ground or water.

Another object is to provide road and guidance systems which are simple to manufacture and easy to maintain.

Still another object is to provide an air cushion vehicle which includes a principal plenum chamber for supporting the vehicle above a reaction surface, and which includes one or more auxiliary chambers lying laterally to either side of the principal chamber, with means being provided to alter the configuration and air capacity of the auxiliary chambers.

Another object is to provide an air cushion vehicle having principal and auxiliary air support plenums, with the auxiliary plenums lying laterally outwardly of the main plenum with the vehicle having means affording communication of support air between the various plenums as well as means for retracting or altering the shape of the lateral chambers.

Another object is to provide means for retracting or altering the shape of the lateral chambers.

Another object is to provide a ground effect or air cushion vehicle having a peripheral skirt generally beneath the deck portion of the vehicle, defining a principal air chamber and having one or more auxiliary skirts lying laterally of the principal chamber, with means being provided to adjust the position of the auxiliary skirt so as to cause the bottom of the vehicle to conform to an existing contoured roadway, as well as to permit operation of the vehicle away from such roadway.

A still further object of the invention is to provide an air cushion vehicle having a specially contoured skirt portion, thereby adapting the plenum or support chamber to be supported centrally within a chamber having a cross section of a predetermined contour.

Still another object is to provide a vehicle and roadway combining one or more of the features referred to herein in various combinations including those referred to elsewhere herein.

The invention achieves these objects, and others which are inherent in the invention, by providing a vehicle having expressly designed plenums, specially designed guidance systems, and by providing a stable roadway of predetermined contours adapted to facilitate longitudinal movement of the vehicle, as well as control thereof for turning, switching, and for changing elevation during ascending or descending maneuvers.

The manner in which these and other objects and advantages of the invention are achieved in practice will become more apparent when reference is made to the following detailed description of the preferred embodiments of the invention set forth by way of example and shown in the accompanying drawings wherein like reference numbers indicate corresponding parts throughout.

BRIEF DESCRIPTION OF THE DRAWINGS

FIG. 10 is a sectional view taken on line 10—10 of FIG. 9;

FIGS. 11 and 12 are enlarged sectional views of sides of FIG. 10;

FIGS. 13 and 14 show modifications of control elements;

FIG. 15 is a plan view showing a preferred arrangement of control elements;

FIG. 16 is a sectional view taken on line 16—16 of FIG. 15;

FIG. 17 is a gear detail view;

FIG. 18 is a sectional view taken on line 18—18 of FIG. 17;

FIG. 26 is a perspective view of the roadway shown diagrammatically in FIG. 25;

FIG. 27 is a perspective view illustrating the use of the roadway of the invention in various physical environments;

FIG. 28 is a diagrammatic plan view showing various roadway configurations adapted to assist in controlling movement of the surface effect vehicles;

FIG. 29 is a perspective view of the one modified form of the vehicle of the invention showing the construction of the lateral or auxiliary plenum chambers used in such vehicle;

FIG. 30 is a front elevational view, with portions broken away, showing the vehicle of FIG. 29 in operation within a guideway of the invention as the vehicle approaches a junction therein;

FIG. 31 shows the vehicle of FIG. 30 being used away from the roadway of FIG. 30;

FIG. 32 is a side elevational view, with portions broken away for purposes of illustration, of a vehicle used with one form of roadway of the invention;

FIG. 33 is a perspective view of the form of roadway shown in FIG. 32, such roadway being shown substantially foreshortened for purposes of illustration, and FIG. 34 shows still another form of roadway embodying the principles of the invention.

DESCRIPTION OF THE PREFERRED EMBODIMENTS OF THE INVENTION

Figure 1:
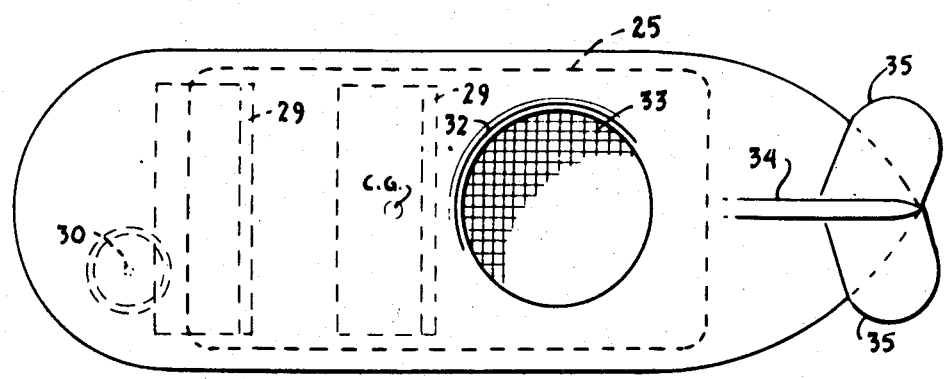
FIG. 1 is a plan view of a preferred embodiment of the invention.

In the following descriptions, it will be assumed that the vehicles used with the roadways of the invention are of an already known type, although the roads are designed so as also to be suitable for use with vehicles of other kinds, including those yet to be designed in detail. As used herein, various expressions such as "Aeromobile", "ground effect machine", "ground effect vehicle", "air cushion vehicle" or combinations thereof, shall be understood to be synonymous, and shall apply equally to so-called plenum-type vehicles as well as to so-called peripheral jet type ground effect vehicles, and these terms shall be taken to encompass any type vehicle resting fully or partially on a volume of entrapped or at least partially confined air. In some cases, the ground effect vehicles are referred to herein as "airplanes" or "aircraft"; however, such terms generally mean surface effect vehicles in this context. Although the preferred vehicles are rendered controllable or steerable by the same air stream which supports them, vehicles using separate propulsion and/or control systems are equally well suited for use with the invention, as are vehicles adopted to be sustained only by themselves and to be propelled or guided by others.

Referring now to the drawings, FIGS. 1, 2, 3, and 4 show a preferred embodiment of the invention adapted to operate adjacent substantially any surface. A frame 25 supports an engine-driven blower 26 which charges the interior of the frame 25 with air and products of combustion. These products are directed downwardly and inwardly of the periphery of the frame 25, in a manner to be described in detail below, to support and control the orientation and translation of the frame above a surface 27. The frame 25 supports a body 28 of airfoil shape containing seats 29 and a control stick 30. The arrangement of the engine-driven blower 26 and the seats 29 is such with respect to the frame 25 that the operator seated in the front seat adjacent to stick 30 causes the center of gravity (C.G.) to attain substantially the position shown. Other passengers arranged adjacent the center of gravity in the rear seat 29 will then not vary the trim of the vehicle. Other passengers in the front seat 29 will vary the trim, and control mechanism to compensate for such condition will be described below.

Although the engine-driven blower 26 may be of several known types within the purview of the invention, it is preferable to use a blower having high volume output at relatively low pressure. by way of example: at a pressure of eighteen inches of water, under a frame 25 having fifty square feet of area within the peripheral jet, a total weight exceeding two tons can be raised from the surface 27. Of course, the distance from the surface determines the rate of escape of air around the frame 25, and the blower is preferably variable in volume to accommodate support at different elevations. This attribute of the invention will be explained in detail below.

This vehicle is controlled so as to move in any direction, hover, rotate around a vertical axis, as well as to move forward at high speed. Accordingly, the body 28 (FIG. 2) is airfoil shaped to provide lift force directed as indicated by the arrow L.B., which will vary substantially as the square of forward velocity to augment the lift force L.J. of the peripheral jet in the bottom of the frame 25 and the lift force of the blower L.F. induced by drawing intake air over a shroud 32 (FIG. 1). A screen 33 preferably covers the opening formed by the shroud 32. A rudder 34 is secured to the trailing section of the body 28 and is equipped with roll stabilizers 35. Control aerlerons can be employed, if desired, or jet flaps as to be described below.

Figure 2:
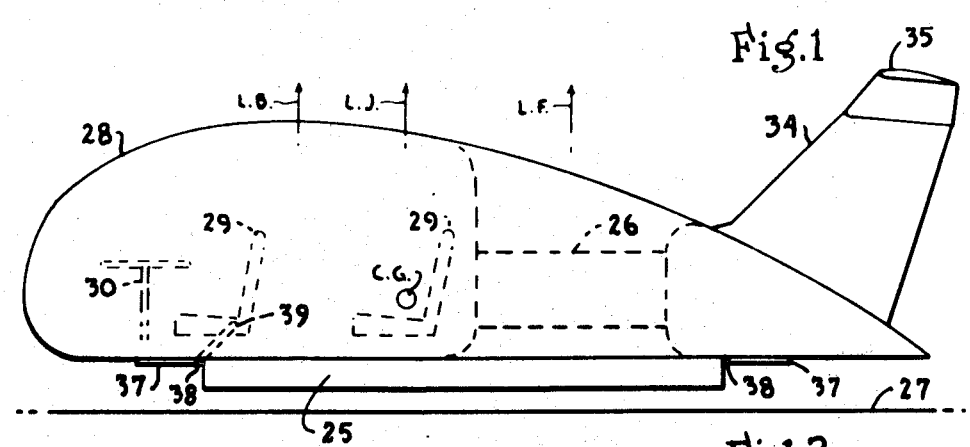
FIG. 2 is a side elevational view of FIG. 1.
Figures 3, 4:
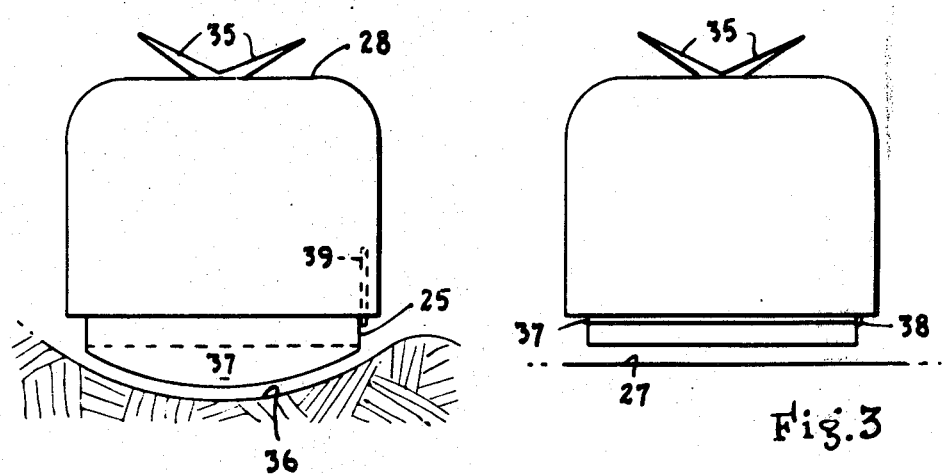
FIG. 3 is a front elevational view of FIG. 2.
FIG. 4 is a front elevational view of the device of FIG. 2 showing baffles extending downwardly therefrom toward a grooved surface.
Figure 5:
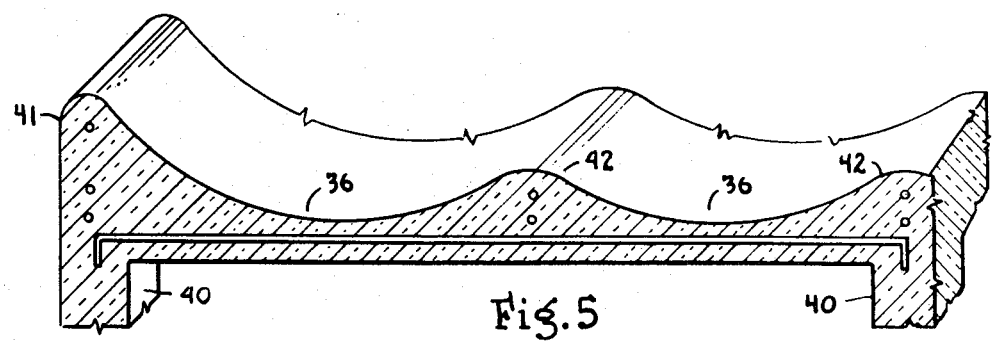
FIG. 5 is a partial cross-sectional view of a portion of road upon which the invention may operate.

The vehicle is shown in FIGS. 2 and 3 supported above a relatively flat surface 27. Provision is made operating the vehicle along roads formed as grooves 36 such as shown in FIGS. 4 and 5. A pair of baffles 37 pivoted on rods 38 linked with a handle 39 are raised to the position shown in FIGS. 2 and 3 for operation over flat surfaces 27 and lowered to the position shown in FIG. 4 for operation over grooved surfaces 36. The curvature of the bottoms of the baffles 37 provides a profile spacing the bottoms a uniform distance from the surface 36. Because of the air pressure acting on the baffles 37 it is contemplated that any known servo-system may be employed.

Roads comprise a valuable corallary attribute of this invention. The grooved surfaces 36 may be of any suitable material. Because the air cushion below the "aeromobile" is evenly distributed over several square feet the strength of road material is of less importance than with wheeled vehicles. Hence, the surface 36 may be earth of various sorts, but preferably one supporting a hardy grass to reduct dust. As shown in FIG. 5, bridges or the like can be made of light aggregate reinforced concrete permitting long spans between piers 40. A fence 41 is provided at the sides of the outer groove 36 to provide a deep beam for long support beams as well as blocking cross winds. Ridges 42 are placed between grooves 36. The "aeromobile" will center by gravity in a groove 36 but can be moved sideways to an adjacent groove by application of power and manipulation of controls to be described below. When in a groove 36, substantially no control except accelerating and braking is required once the vehicle is trimmed for translation. Additional description of this form of combination road and guideway, and other forms of combined roads and guideways, appears elsewhere herein.

Figure 6:
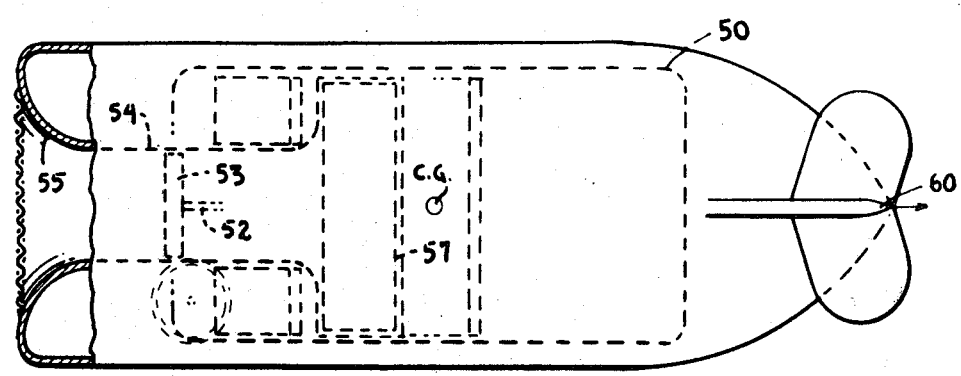
FIGS. 6 and 7 are views similar to FIGS. 1 and 2, but of a modification of the invention.
Figure 7:
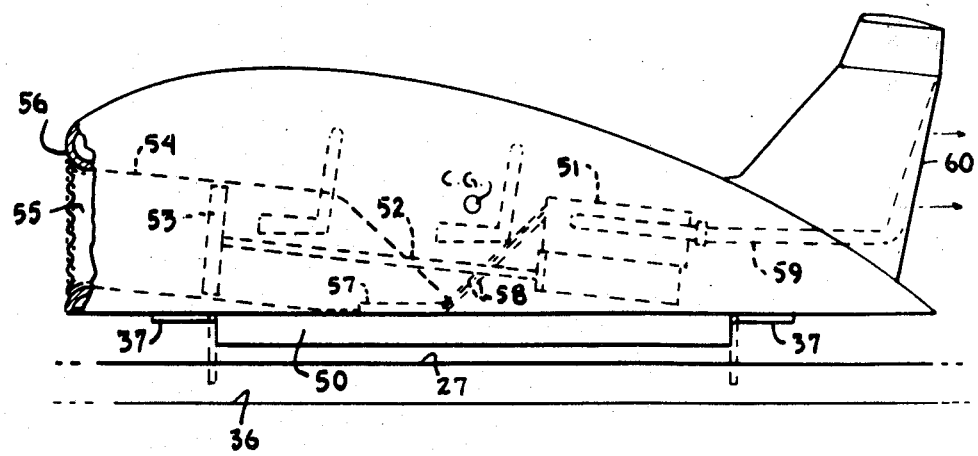

In FIGS. 6 and 7, a modification is shown incorporating a ram-jet scoop and a jet-flap aerodynamic control. A frame 50 is substantially the same as the frame 25 described above. An engine 51 turns a drive shaft 52 connected to a blower 53 positioned in a duct 54. A flaired scoop 55 forms an entrance to the duct 54. The scoop 55 is preferably of large area and the upper portion 56 thereof may be fabricated of transparent plastic or the like for visibility. A radiator 57 is connected by pipes 58 to the engine 51 for cooling the engine and diffusing the air into the frame 50. An exhaust pipe 59 directs exhaust gas out of a movable slit 60 for providing control and propulsion moments. Ths modification is also provided with baffles 37 for operation over flat surfaces 27 or curved surfaces 36.

Figure 8:
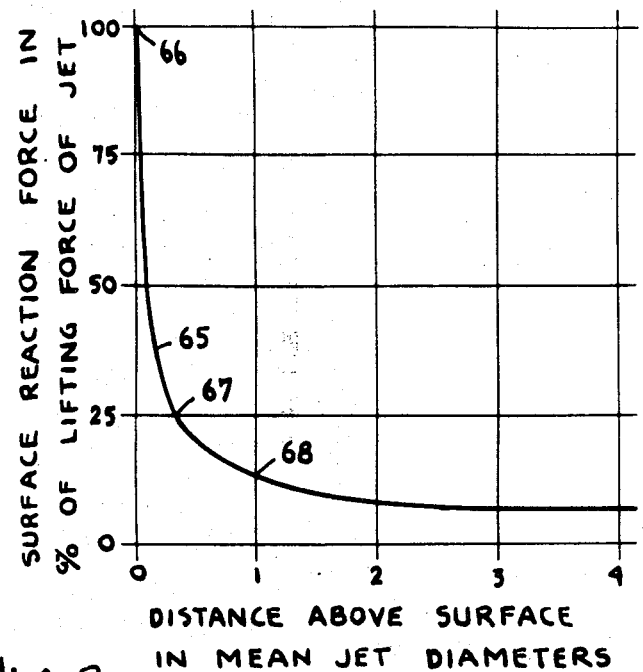
FIG. 8 is a chart of theoretical performance of the invention.

FIG. 8 comprises a chart representing some average of forces available for sustentation of the "aeromobile". It is to be understood that exact forces cannot be represented because of variable surface conditions and turbulent airflow. Being a reaction force it is assumed that one-hundred percent of lifting force of the jet is available when the "aeromobile" is resting upon a support surface. As the distance above the surface is increased the reaction force decreases. This is plotted as a function of mean jet diameters to coordinate same to known experimental data—for example, that contained in "National Advisory Committee for Aeronautics", Technical note 3982, Apr., 1957. It is to be noted that line 65 decreases sharply from the one-hundred percent force position 66 to the twenty-five percent force position 67. Further movement of the "aeromobile" away from the surface decreases the reaction force to a negligible value beyond substantially one-mean-jet diameter 68.

With a mean jet diameter of seven feet it becomes possible to maintain the "aeromobile" several inches above a support surface 27 or 36. The sustentation force will absorb approximately twenty-five to seventy-five percent of the total energy 66 available in the jet. However, in this invention the remaining energy is not dissipated; but is used in large part for propulstion. In jumping obstacles, burst of jet energy may be released through the outlets. Since the "aeromobile" is in levitation and translation upon encountering an obstacle a relatively high or long obstacle can be cleared. In addition to this jet force, there are augmenting forces contributed by aerodynamic phenomena and the ram-jet attribute of the modification shown in FIGS. 6 and 7.

Figure 9:
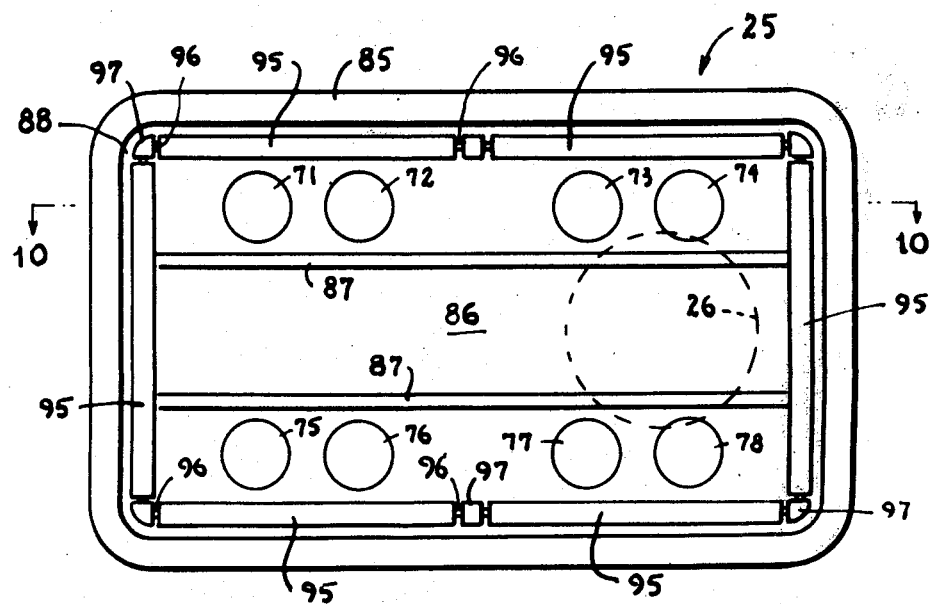
FIG. 9 is a bottom view of an operating part of the invention.

FIG. 9 is a bottom view of the frame 25 and FIG. 10 is a side view thereof. This frame 25 can be used for any of a number of purposes. As shown in these figures, a pallet truck may be provided by securing all manual controls in a box placed to the right of the structure as viewed in FIG. 10. Thus the top 70 of the frame 25 can support loads. Several valves 71–78 are provided for trimming the frame 25 under different loads. In addition, all valves 71–78 can be opened for maximum lift. At such time the blower 26 is energized to supply additional air under pressure. For ease of operation the valves 71–78 are preferably connected in pairs to compensate air pressure. As shown in FIG. 15, valves 71–78 are connected to a lever 80 pivoted at 81 in a bracket. The lever 80 is rocked by a control arm 83 to raise one valve and lower the other simultaneously in the manner of a balanced valve thus compensating for air pressure which will exert substantially equal downward forces on the valves 71–72. Other pairs of valves 73–74, 75–76, and 77–78 are arranged likewise. However, the several pairs of valves 71–78 are controlled differently for trim and collectively for jumping operations, as will be explained more fully below.

The frame 25 is rectangular in plan view (FIGS. 9 and 15) and includes a top member 70 having a downwardly flanged peripheral lip 85 (FIGS. 11 and 12) shaped to direct air downwardly relative to the frame 25 and inwardly relative to the lip 85. The frame 25 further includes a center-plate 86 disposed below the top 70 and inwardly of the peripheral lip 85. The center-plate 86 is provided with a plurality of ribs 87 that serve to strengthen the center-plate 86 against deflection due to pressure, provide rests for the vehicle, and act as keels during translation. When desired, the ribs are supplied with friction material for emergency braking to be described hereinafter under OPERATION.

The frame 25 is provided with a peripheral slot 88 disposed between the lips 85 and the center-body 86, which slot 88 preferably extends completely around the center-body member 86 of the frame 25. The blower 26 is driven by a suitable engine 89 and generates energized air, which air, mixed with exhaust gas, is diffused by a radial diffuser 90 into a substantially void chamber 91 formed within the frame 25 between the top 70 and center-plate 86 thereof. The energized air is diffused throughout the chamber 91 and is exited therefrom through passages 101 formed by the peripheral slot 88 to engage the reaction surface 27 or 36 (FIGS. 3 and 4) and form a pressurized gas cushion between the surface 27 or 36 and frame 25.

For controlling movements of the "aeromobile", control vanes 95 are provided. These vanes 95 may be identical sections mounted on pivots 96 journaled in bars 97 (FIG. 9) connected to the upper surface 70 ends and sides of the center-plate 86. Each section is connected to a control arm 99 for automatic and/or manual control to be described below. Flow-control dampers 100 function in a manner augmenting the functions of valves 71-78 and either or both can be employed as desired. However, the dampers also augment translation movements created by the control vanes 95 as well as total thrust of the jet.

The vanes 95 when in the full line positions shown in FIGS. 11 and 12 are engaged by air moving in the direction of the flow arrows and direct same around peripheral slot passages 101. The aerodynamic action herein obtained is explained fully in my co-pending application Ser. No. 652,298, Apr. 11, 1957, and entitled AIRCRAFT. Lift is obtained and augmented by rotation of a mass of gas through a substantial angle, exceeding ninety degrees. The resultant lift in the "aeromobile" augments the jet reaction force mentioned above. The velocity of flow of gas over the vanes 95 and through the peripheral slot passage 101 is relatively high even though the pressure of gas within the chamber 91 is of low value.

Assuming a maximum pressure within the chamber 91 of one pound per square inch, and a pressure below the "aeromobile" of two-thirds of a pound per square inch, the pressure then causing flow of air through passages 101 will be substantially nine inches of water. From empirical airflow tables, this pressure will create a velocity in excess of one hundred and fifty feet per second. Because the kinetic energy of the air is a function of the square of the velocity thereof, the lift or thrust acting upon the vanes 95 and passages 101 is substantial.

FIGS. 13 and 14 show modifications for obtaining more lift or thrust. In FIG. 13, two vanes 105 are rotated around a pivot 106 in the passage 101. The vanes 105 are preferably shaped and spaced to create thrust and when moved will vary the lateral force acting on the vehicle. FIG. 14 shows a plurality of fixed vanes 107 provided with trailing flaps 108 that control the net thrust of the vanes 107. There may be more or less than the three flaps 108 shown to vary the gross effect of same. Further, the vanes 108 may be divergent with respect to each other to diffuse the air passing over them. Obviously other known control means can be incorporated into these control systems when desired or necessary for efficient functioning.

With any of the above control systems it is found to be desirable to direct the air inwardly beneath the center-plate 86. The peripheral jet emitting from the passage 101 will then create an air-screen to partially entrap air below the plate 86. As a result of entrapment, the air below the plate 86 will be under pressure to float the vehicle on a volume of gas. By varying the net direction of flow of the screen of air, translational and arresting forces can be established to render the vehicle dirigible.

FIGS. 15 through 18 show a control system adapted for manual and/or automatic operation. The control stick 30 comprises a wheel 110 secured to a rod 111 journaled in a gimbal 112 mounted on the frame of the vehicle, shown on the center-plate 86. One or more sheaves 113 are secured to the rod 111 for a control purpose to be explained below. A tube 114 is mounted on the rod 111 and has pins 115 journaled to control bars 116, 117, 118, and 119, which bars in turn are journaled on pins 120 connected to control vanes 95, bars 116 and 117 (FIG. 16) show the instructural details and bars 118 and 119 are similarly connected. Forward movement of the wheel 110 to the dotted lineposition will rotate the fore and aft vanes 95 in a counterclockwise direction. Right and left movements of the wheel 110 control the side vanes 95.

To control body rotation, the side vanes 95 are geared together by a partial differential gear 125. Rotation of the wheel 110 turns the sheaves 113 which move belts 126 directed over rotatably connected idler sheaves 127 to each of the forward side vanes 95, which belts 126 are then directed to gear-operating sheaves 128 connected to control gear 130 of the differential gear 125. The control gear 130 when turned will move one side vane 95 with respect to the other around a pivot 131. As a result of differential movement of the side vanes 95 a difference in thrust will be effected to impart a rotation about a vertical axis of the vehicle.

To trim the "aeromobile" under different loadings the valves 71-78 are operated. For example, if the right-front corner (upper left-FIG. 15) of the vehicle is heavy, the arm 83 is rotated to open valves 75 and 76, whereby more air will be directed below this corner of the machine to trim same.

Automatic control is readily adapted to the above manual control. As shown, a pair of gyroscopically controlled motors 135 are connected to control arms 116 and 119 for controlling fore and aft and transverse movements respectively. Inasmuch as such controls are well known, details of construction form no part of this invention. It is contemplated that the "aeromobile" will operate favorably along roads equipped with structure to which automatic controls can respond. For example, a radio beam can be used; or a wire, or the like, can be buried beneath the surface and a magnetic field can respond thereto for guidance, or the wire may be magnetizable to carry intelligence to which the "aeromobile" control will respond for fully automatic operation. The latter system can be particularly useful when the invention is used as a pallet truck. A magnet wire can be energized and laid down to cause the truck to deliver a pallet to a remote place, leave same, and return for another pallet.

Figure 19:
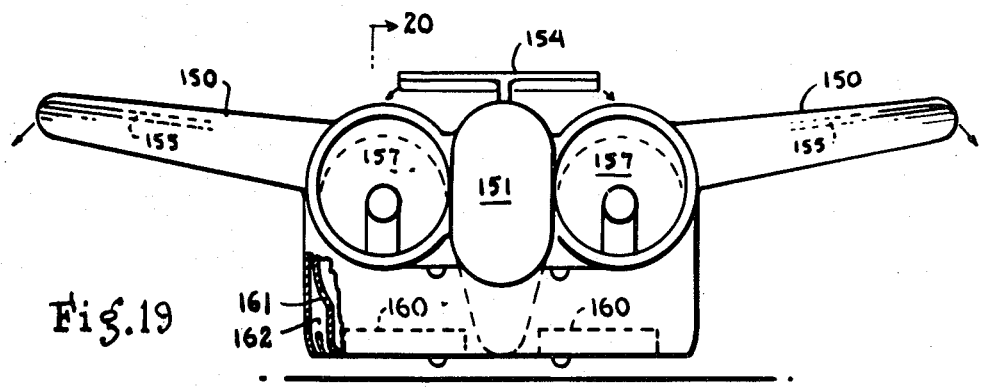
FIG. 19 is a front elevational of the invention incorporated as a ground reactant supporting element for an airplane.
Figure 21:
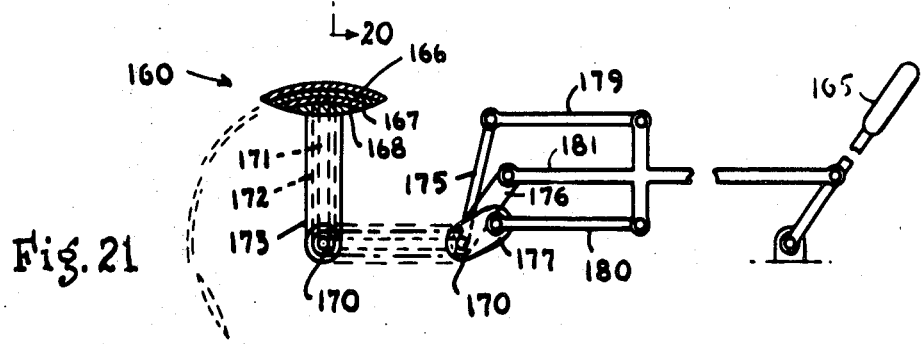
FIG. 21 is a diagrammatic view of fore-and-aft control for the airplane.
Figure 20:
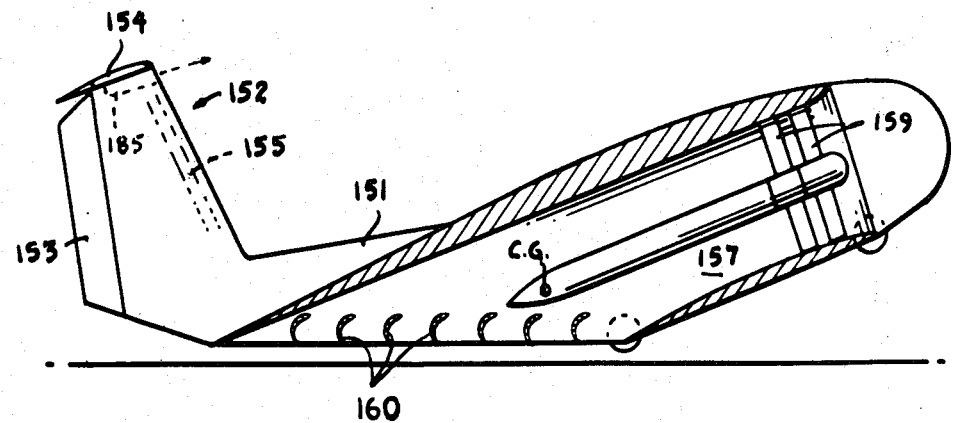
FIG. 20 is a sectional view taken on line 20—20 of FIG. 19.

FIGS. 19, 20, and 21 show features of the "aeromobile" adapted to a STOL (short take-off and landing) aircraft. Such features eliminate landing gear and provide degrees of control not present with present ground gear. One significant advantage comprises the ability to land in any desired direction regardless of prevailing wind direction. Other significant advantages reside in the amphibious quality rendered ability to back-up, move sidewise, rotate, and provides cross-wind gears.

The airplane may be of any suitable configuration, and by way of example is shown as a mono-plane having wings 150 mounted on a fuselage 151 having an empenage 152 including a rudder 153 and an elevator 154. Exhaust gases from an engine or engines, not shown, may be let through ducts 155 and exhausted downwardly and rearwardly through slits 155a in the tips of the wings 150 and the elevator 154 to provide propulsion and turbulence counteracting forces. A pair of ducts 157 are faired into the fuselage 151 and the wings 150. Propellers 159 draw air into these ducts 157 and force it rearward over control vanes 160. A portion of entrained air passes through ports 161 (only one shown) into side chambers 162 and blown downwardly and inwardly over one or more control vanes that may be of any of the types described above to give lateral and rotational control such as described in connection with FIGS. 15-18.

The propellers 159 and control vanes 160 are adapted to function in a manner similar to that disclosed in the above mentioned co-pending AIRCRAFT application. A control lever 165 rotates air reaction surfaces 166, 167, and 168 around a pivot 170 through arms 171, 172, and 173 connected respectively to cranks 175, 176, and 177 in turn connected with arms 179 and 180 and a cruciform link 181 connected to the control lever 165. When the lever 165 is moved to the left the sections 166-168 are rotated counter-clockwise more or less to the dotted line position. In the extreme position the air stream is rotated in the direction of the flow arrows substantially in excess of ninety degrees to provide a substantial force. With the sections nested only a small drag is present and propeller thrust will move the airplane forward. With the sections partially extended the propeller thrust is counteracted to cause the vehicle to hover on a volume of air. With the sections fully extended a rearward net thrust obtains to stop the craft quickly. For emergency stops a cartridge 185 can be discharged and/or the tip jets reversed by suitable valves, not shown.

"AEROMOBILE" OPERATION

With the engine-blower 26 (FIG. 2) operating, the quantity of air delivered generally will vary directly with the speed of the blower, the energy in the air will vary as the square of this speed, and the horsepower required will vary as the cube of the speed. Of course, variations in design cause divergence from these hypothetical criteria. Accordingly, it is preferred to entrain a large quantity of air at relatively low velocity to operate the "aeromobile" at economical horsepower. To vary the total buoyant force of the vehicle, the horsepower is increased as by opening a throttle (not shown) in conventional manner.

With the control stick 30 in its vertical position air will be directed out of passages 101. The side passages 101 may be narrower than the fore and aft passages to provide the largest quantities of air to the latter passages for propulsion and braking operations. If the front of the "aeromobile" is heavy with respect to the rear, valves 71, 72, 75, and 76 can be opened to trim the vehicle. Conversely, if the rear is heavy with respect to the front, valves 73, 74, 77 and 78 can be opened. Valves 71-74 and 75-78 control the left and right sides of the vehicle respectively.

To turn or rotate the "aeromobile", the wheel 110 is rotated, for example, to cause relative differential movement of the right-front and left-rear, and right-rear and left-front vanes 95 to create either a clockwise or a counterclockwise movement around the center of gravity of the "aeromobile".

To cause the "aeromobile" to move sidewise, the stick 30 is moved to the right or left to move all of the side vanes 95 clockwise or counter-clockwise respectively to create a lateral component of force due to flow of air. When traveling forward, the lateral control is adjusted to compensate for cross winds.

Forward and rearward movements of the vehicle are controlled by fore and aft movements of the stick 30. The fore and aft vanes 95 are rotated counter-clockwise by moving the stick 30 forwardly to cause acceleration and forward movement of the vehicle while rotating the fore and aft vanes 95 clockwise by moving the stick 30 rearwardly results in either a braking effect or reverse movement of the vehicle. To maintain a steady-state translation; the fore and aft vanes 95 assume an intermediate position of the two positions hereinbefore described.

When the vehicle is in motion, the airfoil shape of the vehicle body aids to support the vehicle above the reaction surface 27 or 36 and a portion of the energized air normally necessary to provide the air cushion support may be diverted for propulsion purposes such that the horsepower requirement for high speed translation is not excessive. The ram air effect of the air scoop modification of FIGS. 6 and 7 further augments the function of the blower to render the vehicle a more economical operation.

Generally when the vehicle is in motion, particularly on a road as shown in FIGS. 4 and 5, the control stick 30 does not require manipulation. The machine can be operated over any surface and with the baffles 37 in lowered position (FIG. 4) the vehicle can be self controlled over a grooved road. Further, an automatic control 135 (FIG. 15) may be provided as a substitute for manual control when so desired.

To stop the vehicle under normal operation, the aft vane 95 is lowered with a corresponding rise of the fore vane 95. For emergency stops a reaction cartridge can be fired and/or the blower 26 turned off to cause the vehicle to settle upon its bottom. Obviously surface brakes could be lowered or side vanes extended in known manner if desired.

Figure 22:
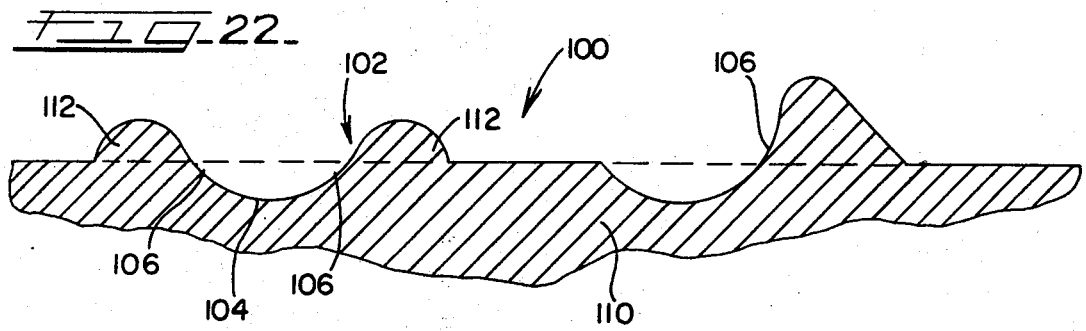
FIG. 22 is a vertical sectional view showing two contoured roadways made according to the invention and somewhat similar to the forms of roadway shown in FIGS. 4 and 5.
Figure 23:
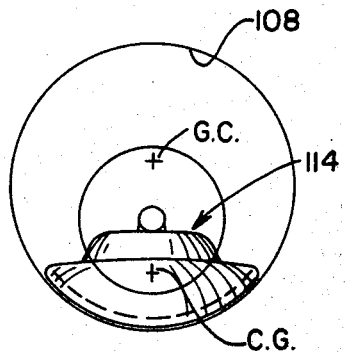
FIG. 23 is a diagrammatic front elevational view showing a ground effect vehicle received within a tubular roadway made according to the invention and showing the vehicle at a rest, hovering, or forward-or-rearward-moving position.
Figure 24:
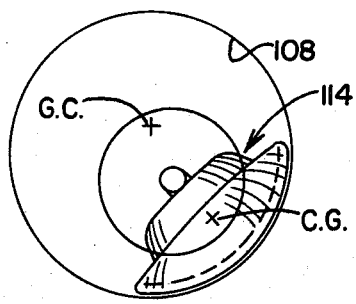
FIG. 24 is a diagrammatic view similar to that of FIG. 23, but showing the attitude of a vehicle while undergoing a turning movement.

Referring now to FIGS. 22-24, one form of the combination road and guideway of the invention, generally designated 100, is shown. FIG. 22 shows individual section variations of a road which comprises a generally open groove, while FIGS. 23 and 24 show the roadway to be embodied in a closed tube. Preferably, the road in the form shown in FIG. 22 includes a contoured surface generally designated 102 which includes a lower portion or sector which may be referred to generally for purposes of illustration as a lower or support quadrant 104, and one or more side or guidance sectors in the form of partial or complete quadrants 106. Thus, while not necessarily subtending a 90° angle, or even a major part thereof, the contour of the road unit is such that it provides, from a functional standpoint, a support sector 104, one or more guide sectors 106 and, in the case of the embodiment shown in FIGS. 23 and 24, an overhead or protective sector 108.

In the embodiment shown as the right hand portion of FIG. 22, the righthand guide sector 106 is raised substantially in respect to the left hand guide portion, if any, on the opposite side of the combination road and guideway 100. This configuration would be used for moderate or high speed turns where additional guiding or supporting surface is required laterally outwardly of the vehicle received within the roadway 100. As shown in FIG. 22, one simple and hence preferred form of roadway consists of an excavation or cut taken from the earth 110, with the material from the excavation or cut forming fills 112 lying to either side of the excavation. Once given the contours shown in FIG. 25, the soil may be treated or stabilized by the addition of suitable material, such as oil, penetration macadam, concrete, or the like, with or without additional treatment to reduce dust by any one or more of the foregoing methods, or by permitting grass or the like to grow therein.

Referring now to FIGS. 23 and 24, the geometric center of the enclosed roadway 100 is shown as a cross marked GC, while the vehicle apparent center of gravity, identified as C.G., lies substantially below the geometric center of the tube or roadway. Accordingly, when sustained or buoyed upon air, a ground or surface effect vehicle generally designated 114 will tend to center according to gravity into the position shown in FIG. 23. When lateral forces are applied to the vehicle 114, such as the reaction forces generated during a turning movement, the vehicle will tend to ride up one or the other of the side walls 106 into a position such as that shown for example in FIG. 24.

Referring now to FIG. 27, a construction is shown wherein the roadway generally designated 100 might assume both the forms shown in FIG. 22 and in FIGS. 23 and 24. Thus, the roadway shown in FIG. 27 comprises a first portion 116 which is shown to extend over an area of generally level ground 118, with the contour of the ground being raised at a pair of formations generally indicated at 120 which lie to either side of a gully or ravine, or, as shown, a river or like body of water 122 flowing between one or two steep banks 124. Accordingly, the first portion of the roadway 116 would comprise a groove or roadway deep enough merely to provide lateral support and to permit the vehicle to move generally straight ahead in the roadway 100, while the roadway would assume the form of a tube 126 having an upper or protective sector 108 forming the top thereof. In the form shown, the tube 126 extends beneath the ground in the areas 120, and extends across the ditch or gully in which the water 122 flows. As shown, the tube portion 126 is unsupported throughout its length, which would be the case in the event that a suitably short span of water or other geographic formation were to be traversed by the combined road and guideway 100. Upon emerging on the other side of the bank 120, the roadway 100 again assumes the form of an open trough or track 116, when physical features of the terrain permit.

Referring now to FIGS. 29-31, a modified form of air cushion vehicle generally designated 200 is shown, such vehicle being especially adaptable and preferred for use with the novel combination roads and guideways of the invention. This vehicle will be seen to comprise, among other things, a conventional main deck or flow divider 202 having generally circular walls 204 defining an air entrance opening 206 therein, and to include one or more combination power and fan units generally designated 208 supported concentrically with and just above the openings 206. Each power unit 208 typically includes an engine 210, a duct or shroud 212, and gimbal or universal mounting means which include a pivot 214 received on an arm 216 fixedly attached to a rotary ring 218 which is coaxially aligned with the opening 206. According to this concept, the entire assembly 208 may be pivoted about a generally horizontally extending axis concentric with the pivot 214, and the orientation of the pivot axis may be changed by rotating the ring 218 about a generally vertical center line. Accordingly, a portion of the air may be directed into a plenum 220 disposed beneath the vehicle 200, while the remainder of the air is directed as shown by arrows 222 above the deck 202 in any direction desired to achieve propulsion, or steering control, or both. The form of control and power arrangement just described is one which is suited for use with the invention. Another preferred construction which is somewhat similar but which differs in detail is described and claimed in my copending application Ser. No. 107,350, filed Jan. 18, 1971, now U.S. Pat. No. 3,827,527.

A principal feature of the improved vehicle 200 of the invention is the provision of one or more auxiliary plenums 224 which may lie laterally outwardly or otherwise spaced from the principal plenum 220. The auxiliary plenums 224 are formed by relatively rigid top plates 226, and by a plurality of individual modules generally designated 228, which are disposed beneath the panels 226 and which, as a group, comprise the skirt 230 of one of the auxiliary plenums 224.

Referring now to the construction of the portion of the vehicle 200 which defines the outer lateral or auxiliary plenums 224, and referring particularly to FIGS. 29-31, it is shown that a peripheral skirt generally designated 227 is formed by a plurality of individual skirt modules 228, each of which includes an end panel 230 which, although of a somewhat rounded configuration, extends generally longitudinally of the vehicle, and merges into a pair of generally triangular shaped, laterally extending skirt panel 232. The upper margins of both the lateral and end panels 230, 232 lie closely adjacent and may be fastened to the lower surface of the top panel or plate 226. The lower margin 234 of each module 228 is ordinarily maintained under tension when the plenum 224 is filled with air under pressure, and since each panel is also fastened at its laterally inner edges, the modules tend under inflation to assume the shape shown, with the plane of the bottom margin 234 and the outer skirt portions 230 respectively being approximately perpendicular to each other. In the preferred form, the modules 228 not only extend along the entire lateral extent of the vehicle 200, but these panels terminate by wrapping around the end portion of the plate 226 at either end of the vehicle. Thus, as shown broken away in FIG. 29, the end modules 228 are fastened beneath a rearward portion 236 of the plate 226, with the end panels 230 of each module 228 describing an arc.

Accordingly, the end portions of each plenum assume a generally rounded contour, both in top plan view and in front and rear elevations. This function is the same as that provided by the flaps or baffles 37 shown at each end of the vehicles of FIGS. 2 and 4. Referring to FIG. 30, it is shown that the end modules are also somewhat curvilinear in front elevation; however, the end modules are equally well adapted to receive air from within the plenum 224 and be inflated to the approximate position shown. This prevents escape of air outwardly of the forward and rear ends of the plenum 224, while maintaining the bottom margin 234 of the modules 228 near the surface above which the vehicle is supported.

Referring further to the construction of the vehicle 200 it may be seen that in each outer panel 238 of the modules 240 which form the peripheral skirt for the inner plenum 220, is a bleed air opening 242. This opening 242 permits a certain portion of air within the plenum 220 to escape so as to fill the auxiliary or lateral plenum 224 with low pressure air.

Referring now to another important feature of the invention, the plates 226 are shown to be mounted along their inner margins 224 to the deck 202 by means of including one or more hinges 246 providing pivotal movement of the plates 226. Preferably, fluid cylinder and piston assemblies 248 are pivotally attached as at 250 to the deck 202, with each assembly 248 including a rod 252 extending out of the other end thereof, and with the end of the rod 252 terminating in a clevis or fastener forming a part of a control arm 254 which extends upwardly from the plate 226. Accordingly, movement of the rod 252 into or out of the piston and cylinder assembly 248 will cause the plate 226 to move, as for example, between the position thereof shown in FIGS. 30 and 31. Reference will be made elsewhere herein to the use and operation of the vehicle in this mode.

The foregoing description of the preferred type of skirt is believed sufficient to enable those skilled in the art to practice the invention. However, additional information on the preferred skirt design, as well as information relating to other suitable designs, including designs which may be modified for use in the present invention, is set forth in a booklet entitled "Skirt Design for Homebuilt Hovercraft", an NAACVE publication, Copyright 1968 by J. A. Eglen.

Particular reference is made therein to a so-called segmented skirt (type (c) which is also described on pages 7-13. It will be noted that the construction of plural-plenum vehicles described herein is not referred to in such publication, although the skirt constructions are so described.

Referring again to the construction of the vehicle 200, with the plates 226 in the raised position shown in FIG. 30, the margin portions 234 of the outer skirt modules 228 lie in a nearly horizontal position, with the lower corners 256 thereof being just slightly spaced apart in use from the quadrant 106 of the roadway 100. The lower margin 258 of the skirt modules 240 are also closely spaced apart from the roadway 100, just overlying the supporting portion 104 of the combination road and guideway 100. Thus, a relatively large volume plenum, consisting of the principal plenum 220 and the two auxiliary plenums 224, is provided where the vehicle 200 is to be used within one of the grooved roadways of the invention, and this permits the vehicle to ride somewhat lower and closer to the ground, as well as to provide an improved guiding or control function, as will presently appear.

Referring now to FIG. 31, it is shown that with the rods 252 extended outwardly from the piston and cylinder assemblies 248, the control arms 254 are rocked to a position in which the top plate 226 are substantially horizontal and wherein the corners 256 of the skirt modules 228 are spaced above a surface over which the vehicle rides in an amount approximately equal to the spacing between such surface and the counterpart corners 260 of the inner skirt modules 240. This construction may also be advantageously used where an enlarged cross-sectional area, such as a station area, occurs within the roadway 100. In such a case, as the vehicle stops, the plates 226 may be lowered and the deck 202 and plates 226 are flush with each other. FIG. 31 shows the tunnel outline in phantom lines and shows a platform "P" to the viewer's right of the vehicle.

Referring now to FIGS. 32 and 33, another important feature of the combination road and guideways of the invention is shown. As illustrated therein, a vehicle generally designated 200 is shown to be undergoing a gradual descent to a position of lower level, it being understood that air passing into the power unit 208 is directed partly into the plenum beneath the vehicle 200 and partly to the rear thereof for propulsion. As is shown, a plurality of relatively steep steps 300 are provided in a roadway generally designated 302, with the steps 300 being widely spaced apart and interconnected by slightly inclined curb or sidewall portions having top surfaces 304, and lower support surfaces 306. According to the invention, the surfaces 304, 306 may be generally horizontal, or may be inclined somewhat oppositely to the general direction of intended vehicle progress. Thus, assuming that the vehicle 200 is moving to the right as shown in FIG. 32, the surfaces 304, 306 are inclined very slightly upwardly to the right, with steps 300 being angled more sharply downwardly. This road construction is made to take advantage of and to allow for certain inherent characteristics of air cushion vehicles, that is, their tendency to proceed down a line of maximum declivity while sustenation is present. Thus, a chronic drawback of air cushion vehicles of the prior art is that when attempting to traverse a hill or other formation, the vehicle would tend to slide downhill of that portion of the terrain, making it difficult or impossible for the vehicle to ascend under precise control. In this respect the vehicle might be thought to behave as a vehicle having unpowered spherical rather than cylindrical tires or wheels, for example. According to the present invention, however, a groove is provided which prevents movement of the vehicle to either side of the intended line of the vehicle's movement, while the steps 300 provide a dual function of permitting the air cushion vehicle to rise or descend easily over them in view of its flexible skirt construction, and also permits the principal line of the road surface 306 to be approximately horizontal, thereby eliminating a tendency of the vehicle to proceed down the hill at an uncontrolled rate, or be required to be pushed up the hill without pausing. In other words, the characteristics of an air cushion vehicle are such that it is very efficient in performing the function of lifting itself to a height just above the height at which the skirt contacts the ground, but it is very inefficient in proceeding up a long incline where the force or work necessary to do so must be performed without the benefit of frictional gripping or control. Likewise, air cushion vehicles tend, when moved downhill, in view of their almost total lack of friction, to accelerate rapidly much as would a wheeled vehicle having very little friction and no brakes. According to the present invention, the steps provide means for the vehicle to raise itself at periodic intervals, or to lower itself where desired, but the relatively long extents of roadway 306, which are relatively level, insure that during most of the time, the vehicle will not be required to exert wasteful effort in the case of moving uphill and will not lose control moving downhill. Consequently, it may be desired to place the illustrated slight reverse pitch on the supporting portion 304 of the road as a safety factor to insure that the vehicle moving generally downhill does not acquire undue speed. Because of the construction of the vehicle and the steps, the unit does not tend to gather speed when moving over the rather sharp steps 300, and accordingly, control of the vehicle both ascending and descending is easily accomplished, since the vehicle is used in its most efficient mode, particularly for uphill movements.

Referring now to FIG. 34, another important form of the invention is shown, namely, a form which is intended to take advantage of existing transportation facilities in a simple, effective, economical and straightforward way. According to the concept shown in FIG. 4, a roadway generally designated 400 is shown to be formed of a vehicle supporting surface 402 and a pair of oppositely disposed guide or control surfaces 404, with the bottom surface 402 including pre-existing tracks 406 secured together by ties 408 to form a railroad right-of-way. According to the invention, the walls 404 are of generally curvilinear cross-section, and are fastened by any suitable means to the portions of the ties 408 lying outwardly of the rails 406.

Inasmuch as the surfaces provided by the walls 404 need only afford a guiding surface and are not subjected to substantial reaction forces, these walls may be made from a thin metal, from lightweight concrete, from other lightweight aggregate-containing material, or from reinforced plastics or the like. The only requirement for such construction besides the ability to be self-supporting and to resist weather and the like is that they are imperforate so as to prevent the escape of air therethrough.

At each road or other intersection area generally designated 410, folding sidewalls generally designated 412 may be provided, with these units preferably being mounted as by hinges 414 at the lower and inner margins of the sidewalls 404. FIG. 34 also shows diagonal braces 416 existing at the transition portions of the sidewalls 404. This form of brace may be used to support the walls 404, with braces being spaced at suitable intervals along the extent of the walls 404. However, the sidewalls could be merely cantilevered or otherwise suitable constructed.

By providing a vehicle track of the type just described, a number of advantages may be obtained. First, very economical production of a roadway can be achieved, since even in making the sidewalls from fairly substantial steel, coated to resist rust or the like, a mile length of roadway could be constructed for a few thousand dollars or less. With specialized materials, even greater cost savings might be achieved. This is in contrast to building high speed roads of today, where costs of several million dollars per mile or more are not uncommon. Moreover, the large number of railroad rights-of-way exist in this and other countries which are not being fully or effectively utilized, and such tracks or track beds, especially unused or lightly used tracks or beds would make ideal tracks for air cushioned vehicles.

Furthermore, in addition to the facts of their existence and the low cost, the nature of railroad rights-of-way makes them particularly adaptable for use as vehicle roads and guideways. Since railroads are laid out for locomotives which are capable only of ascending or descending relatively gradual grades, one important disadvantage of air cushioned vehicles, namely, their difficulty in ascending and descending hills under proper control, is almost eliminated. Moreover, railroads are normally superelevated or banked in the regions of curves, and embody gradual, sweeping curves of the type which ground or surface effect vehicles may easily traverse under good control and without subjecting the occupants to discomfort. Moreover, such gradual curves are compatible with high speed operation, particularly where, as would be the case at the present time, there would be little or no danger of collision, and where the road and guideway is characterized by the virtual absence of friction.

Referring now to FIG. 28, a diagrammatic view of a preferred arrangement of a road layout generally designated 400 is shown to embody the principle of the invention with this form of layout including an outer combination road and guideway 402 of a generally curvilinear form connected to an inner curved loop 404 by an arcuate transition portion 406. As shown, vehicles traveling along the combination guideway 402 may proceed counterclockwise along the main track 402, or may effect a "U-turn" in order to return or move in an opposite direction in an oppositely directed or opposite hand one-way track 404.

In the form of layout shown, the track 402 includes a pair of primary traffic loops 408 lying radially inwardly of the track 402 and a similar primary loop 408 lying between the inner and outer guideways 404, 402. Access to each individual primary loop 408 is provided by a simple, Y-type junction of the type shown in FIGS. 25 and 26. Two of the primary loops 408 are also shown to include inner tracks 410 having stations 412 disposed thereon, as well as outer or bypass tracks 414. One of the loops 408 is shown to comprise only a single track, while still another loop 408 contains a plurality of much smaller secondary loops 416, with both primary and secondary loops approaching and departing from the larger loops with which they are associated at a tangential or transition portion.

Accordingly, bearing in mind that FIG. 28 is shown on an extremely reduced scale, it will be understood that vehicles of the invention would customarily move along tracks 402 or 404 at relatively rapid rates, slowing down when the vehicle operators wish to enter one of the primary loops 408, and further slowing when it is desired to stop in a tracking or storage loop 116. The loops 408 shown between tracks 402 and 404 are arranged so that vehicles might stop at the loading station 412 for relatively long stops, such as cargo loading, while the operator might make shorter stops as for passenger discharge, along track 414.

Naturally, the foregoing arrangement is shown merely to illustrate the principle that an arrangement of roads and guideways may be made to take advantage of the control characteristics of the vehicles, it being understood that the turns from relatively high speed loops are accomplished by a gradual transition and that a succession of turns may be arranged so as to permit varying speed areas to exist close to one another and without creating high differential vehicle speeds in any single locality. Thus, the principal illustrated in FIG. 28 may be carried out providing any smaller or larger number of interconnecting loops, such as tertiary or quaternary loops, it being further understood that while these loops are preferably arcuate, they need not and probably would not necessarily consist entirely of circles or circular sections.

Referring now to the operation of vehicles of the type shown, for example, in FIGS. 1-4, 6, 7 and 29-31 with the specially designed roadways of the types shown in FIGS. 4, 5, and 22-28, for example, several modes of operation are possible. A vehicle of the type shown in FIGS. 2, 4 and 7 may, by lowering the baffle or flap 37 provide a plenum having the arcuate transverse cross section adapted for use with the roads of the type shown in FIGS. 4, 5 and 22–28, for example. In this instance, the baffle prevents escape of too much air from the front or rear portions of the plenum, and once the vehicle is in operation, sufficient lift is provided to center the vehicle within its associated groove or guideway. Turning of a vehicle of the type shown in FIGS. 1–4 and 6 and 7 may be achieved by movement of the controls which in turn change the air flow controlled by the vanes 95 (FIGS. 9–12). The lateral thrust may be achieved by manipulating the vanes 105 shown in FIG. 13, or by bleeding air from a side portion of the plenum or by manipulating the vertical fin 34 or other control surface, with the effect thereof varying in a known manner according to the magnitude of the force, speed of the vehicle, etc.

In the embodiment of the invention shown in FIGS. 30 and 31, a rounded skirt is provided by arranging the skirt segments or modules so as to provide a curvilinear lower periphery at the front and rear end of the main plenum 220 as well as at the front and rear ends of the lateral or auxiliary plenums 224. A vehicle having this skirt configuration will operate in the same manner as the vehicle having the baffle or flap 37 shown in FIGS. 2 and 4; however, the vehicles of FIGS. 30 and 31, in which the segmented skirt formed from modules which may be considerably more flexible, is adapted to operate equally well over relatively flat surfaces of the type over which a vehicle made according to FIG. 3 is adapted to operate. Thus, the segmented flexible skirt vehicle 200 is in some respects an improvement over the vehicle of FIGS. 1–4, although the earlier described vehicle is operable within and without the track or road and guideway of the invention. As pointed out above, when the vehicle of FIGS. 30 and 31 is intended to be operated over flat ground, the plates 226 are lowered such that the corners 256 of the skirt modules 228 are spaced just above the ground surface by only the usual working clearance.

Figure 25:
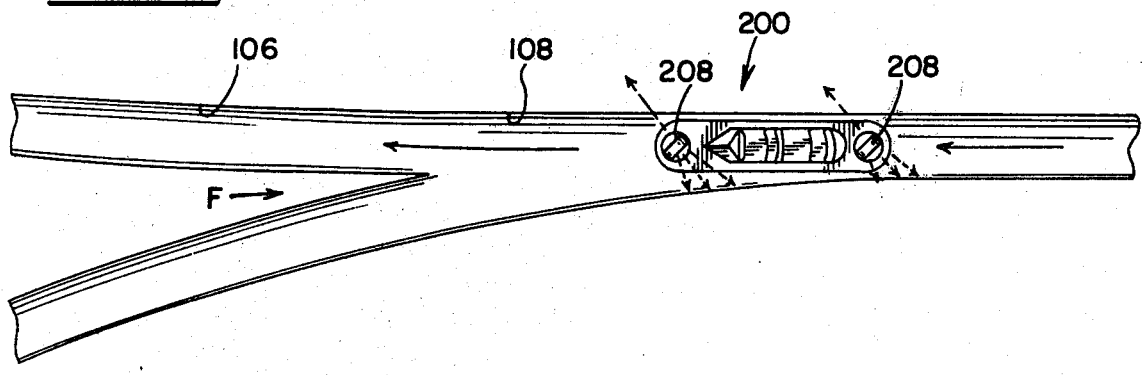
FIG. 25 is a top plan view, partially diagrammatic, showing a roadway junction, showing the movement of a vehicle therein and depicting control of the vehicle being accomplished by the combination control and support fans associated with the vehicle.

Referring now to the operation of the vehicle of the type shown in FIGS. 29–31 within the roadways of the type shown in FIGS. 3, 5, and 22–29, a preferred manner of guiding the vehicle along generally straight lines as well as guiding it through turning movements will be described. FIGS. 29 and 30 show that, under ordinary conditions, the power unit 208 inflates or maintains significant air pressure within the principal plenum 220 and that air passing through the openings 242 also serves to maintain an air cushion within the auxiliary plenum 224. Since the volume of all plenums taken together is greater than that of the principal plenum only, and also larger than that of all three plenums when the panels 226 are in the lowered position, the lifting forces are reduced, and the vehicle tends to operate at a reduced clearance between itself and the supporting and guiding surfaces 104, 106 of the roadways 100. Naturally, the angle made by the plane of the blower with respect to the plane of the deck opening 206 as well as the power setting of the engine will also affect the height of the vehicle. However, assuming an equilibrium state wherein the vehicle is at a given height, and assuming that a certain amount of air indicated by arrows 222 is divided for passage over the deck 202 to provide forward and/or lateral thrust, the vehicle will move generally centrally of the combination roads and guideways 100. By way of explanation, it should be pointed out that disposing the power unit 208 at an angle such as that shown in FIG. 26 will not ordinarily affect the trim of the vehicle when seen from either end, i.e., the air passing over the deck 202 will provide lateral thrust, but the fact that the air is directed into one side or the other of the plenum 220 will not materially tend to cause one side or the other of the vehicle to be raised significantly. Accordingly, assuming the vehicle of FIGS. 29–31 to be moving straight ahead, and further assuming the vehicle to encounter a branch or fork generally designated F in FIGS. 25 and 26 lying in the roadway 100, the vehicle will be urged laterally by reaction forces opposite the direction of air discharge from the power unit 208. As shown in FIG. 25 with the power units 208 disposed at an angle to the direction of vehicle travel, and shown as discharging air at approximately a four o'clock position, the vehicle will be urged laterally by forces directed generally toward a ten o'clock position, maintaining the vehicle 200 in a closely spaced apart relation to the guide surfaces 106. As a widened portion of roadway 100 is approached, as shown in FIG. 30, the vehicle may tilt somewhat downwardly on the right as shown in FIG. 30 because of loss of air support in the auxiliary plenum 224; however, this is only temporary and it does not tend to move the vehicle in the direction of tilt, but rather, tends to urge it in the opposite direction by reason of the reaction forces created in response to air discharge through the openings 242. Thus, the type of vehicles shown in FIGS. 29–31 will tend to center within the contoured surface 102 of a roadway 100 between the lateral guide surfaces 106, and will tend to move along the path of the roadway.

While the effect created by discharge of air through the openings 242 causes the vehicle to tend to remain toward the closed or raised side of the road and guideway 100, and while this effect may be augmented by other forces, the forces applied by the power unit 208 are of greater magnitude than the forces created by escape of air, and, therefore, the vehicle 200 will easily move in response to movement of the power unit 208 and is thus primarily controlled by manipulation thereof.

Having described the several forms of preferred combination road and guideways, and forms of vehicle which are useful therewith, reference will now be made to certain other suggested forms of air cushion vehicles and to systems proposed for use therewith.

At present, one suggested form of rapid mass transportation system suggests the use of single vehicles or trains of vehicles moving along a guideway having a central portion thereof extending into a slot or cavity in the vehicle. It is proposed that vehicles of this type will be sustained on an air cushion and propelled by an infinite length solenoid or so-called linear induction motor, with the coils or portion of the motor corresponding to the stator lying within the vehicle and the non-magnetic conductive element being fixed and/or forming a part of a rail or like unit. While this concept is theoretically attractive, roadways made for vehicles of this sort must be extremely precise inasmuch as the effectiveness of linear induction motors depends greatly on the air gap between the pole piece, the conductor, and the return piece. Accordingly, any movement of the vehicle outside its intended plane of movement adversely affects the flux in the air gap, and if movement is substantial, damage to the motor is likely. It is well known that high precision and great expense go hand in hand, and thus such system is undesirable.

The object of the present invention is to provide an air cushion vehicle which is capable of rapid movement but which may move along tracks which need not be precisely aligned. Ordinarily, air cushion vehicles of the type referred to herein operate while over surfaces which are less precisely graded than even secondary dirt or gravel roads. Accordingly, manufacturing tubes, grooves, or road or guideways useful with the invention need not be carried out with any more than the most rudimentary accuracy.

Other air cushion systems have been suggested which utilize guideways in the form of a monorail or the like. Constructions of this type are likewise extremely expensive in that the structural stresses must be concentrated in the vicinity of the support piers, and these piers must in turn be supported on expensive structures of some sort. According to the present invention, mere grooves in the ground of roughly uniform cross section suffice to provide guidance and such surfaces are virtually the ultimate in simplicity. For example, grooves made according to the invention may be traversed rapidly by vehicles where even a certain amount of water lies in the groove or tube.

In the prior art, a number of proposals have been made for propelling vehicles within totally enclosed tubes or tunnels, some of which may operate at reduced or sub-asmospheric pressures. While there are some theoretical advantages to these systems, they are characterized by unduly high expense, lack of access, and, in the case of evacuated systems, they are characterized by the requirement for sliding seals and closed and sealed operator and passenger compartments.

Vehicles proposed for use with the present invention operate on a reaction basis and may be used very advantageously any place within the atmosphere. The graduated roadways of the invention make possible easy and controlled ascent and descent of even relatively steep grades. Certain of the proposed road structures, such as those made by merely adding side guides to existing railroad rights-of-way are extremely economical. All of these proposed systems are fully compatible with simplified control systems.

While the invention has been illustrated with respect to vehicles which may accommodate only a few people, such as ten people or less, it is well known that air cushion vehicles of suitable power may accommodate larger numbers of people without difficulty, and that such vehicles are characterized by the ability to traverse difficult-to-cross environments, including waterways and swamps or marshy areas. This is particularly important in places such as underdeveloped countries where there are no good roads and where alternate modes of transportation comprise helicopters, fixed wing aircraft, or the like, some of which require improved runways for landing and all of which are very expensive in relation to their payload capacity.

According to the present invention, air cushion vehicles can easily lay their own tracks or roadways in the form of thin sheets or tubes as they move along, in view of their ability to be supported above various types of surfaces and in view of the fact that combination road and guideways may support considerable weight on a substrate because it does so at extremely low pressures.

It will thus be seen that the present invention provides various novel forms of surface effect vehicles and guideways therefor, such vehicles and guideways having a number of advantages and characteristics, including those pointed out herein and others which are inherent in the invention. Preferred embodiments of the invention having been described by way of example only, it will be understood that variations and modifications to the forms thereof described in detail will occur to those skilled in the art and it is anticipated that such modifications may be made without departing from the spirit of the invention or the scope of the claims appended hereto.

I claim:

1. An improved air cushion vehicle comprising, in combination, means including an upper deck and a skirt depending from the peripheral edge of said deck and arranged so as to define the periphery of a primary air support plenum beneath said deck for supporting said vehicle above a surface, and means forming at least one secondary plenum lying laterally of said primary plenum, said secondary plenum being at least partially defined by a secondary plenum skirt depending from rigid means hingedly mounted with respect to said upper deck, means for supplying a volume of air under pressure to said primary plenum, with bleed air openings being provided in said skirt defining said primary plenum, so as to permit said air under pressure to flow from said primary plenum into said secondary plenum, said primary plenum being of a size relative to said secondary plenum so that said vehicle may be supported above said surface entirely by said primary plenum alone, with said secondary plenum being swingable outwardly and upwardly to a position for cooperation with a supporting surface when said supporting surface is in the form of a track having an upwardly and outwardly curved surface portion.

2. An improved air cushion vehicle as defined in claim 1 wherein said at least one secondary plenum comprises a pair of substantially identical secondary plenums and extending substantially the same length as the length of said primary plenum.

3. An improved air cushion vehicle as defined in claim 2 which further includes a crank mechanism for each secondary plenum deck, said crank mechanism being operable to swing said plenums upwardly and outwardly through an arc, and being further operable to hold said plenums in any predetermined positions of use.

4. An improved air cushion vehicle as defined in claim 1 wherein said upper deck forms the upper primary plenum deck and said at least one secondary plenum comprises a pair of substantially identical, laterally disposed plenums, said hingedly mounted rigid means on each of said plenums comprising a secondary plenum deck portion, said vehicle further including a hinge means being attached to said peripheral edge of said primary plenum deck and thereby pivotally attaching each of said secondary plenum deck members to said upper deck, whereby said swingable secondary plenum panels are movable through an arc having said peripheral edge of said deck as the pivot point thereof.

5. An improved air cushion vehicle as defined in claim 1 wherein said skirt depending from said peripheral edge of said deck and defining a portion of the periphery of said primary air support plenum is made from a plurality of skirt panels, and wherein said bleed openings comprise a bleed opening for each of said skirt panels.

6. An improved air cushion vehicle, said vehicle comprising, in combination, an upper deck portion with forward and rear deck ends and a pair of laterally outwardly disposed, longitudinally extending upper deck edges, a skirt having upper portions thereof attached to and depending downward from said upper deck along a substantial length of said deck, said downwardly depending skirt forming a primary air support plenum for said vehicle, said primary plenum being of sufficient size to support the entire weight of said vehicle when said plenum is pressurized, a pair of hinge means, each of said hinge means having one portion thereof attached to and extending longitudinally along each of said upper deck edges and another portion having a secondary plenum deck unit attached thereto retaining a pair of secondary plenum deck units to the upper deck portion, a powered crank mechanism for each secondary plenum for moving each of said secondary plenum deck units between a range of operative positions, said secondary plenum units having a laterally outwardly disposed, longitudinally extending edge, a secondary skirt portion depending from each of said edges of the secondary plenum units, each of said skirts at least partially defining a secondary air plenum beneath its associated secondary plenum deck, means for supplying a volume of air under pressure to said primary plenum to support said vehicle, bleed air openings in said skirt portions of said primary plenum, said openings providing communication between said primary plenum and said two secondary plenums for pressurizing said secondary plenums from said primary plenum, said range of positions of said secondary plenums including a lower position wherein the skirt portion of said secondary plenums may cooperate with a flat surface supporting said vehicle and an upward position wherein said skirt portions of said secondary plenums cooperate with a supporting surface when said supporting surface is in the form of a track having upwardly and outwardly curved surface portions.

* * * * *